(12) United States Patent
Zhu (10) Patent No.: US 11,585,360 B2
(45) Date of Patent: Feb. 21, 2023

(54) CONNECTOR AND FENCE USING SAME

(71) Applicant: Shanghai NEOCRAFT Tool Co., Ltd, Shanghai (CN)

(72) Inventor: Hongwen Zhu, Shanghai (CN)

(73) Assignee: Shanghai NEOCRAFT Tool Co., Ltd, Shanghai (CN)

( * ) Notice: Subject to any disclaimer, the term of this patent is extended or adjusted under 35 U.S.C. 154(b) by 0 days.

(21) Appl. No.: 17/019,291

(22) Filed: Sep. 13, 2020

(65) Prior Publication Data

US 2020/0408233 A1   Dec. 31, 2020

(51) Int. Cl.
| | | |
|---|---|---|
| *A01K 1/03* | (2006.01) | |
| *F16B 5/06* | (2006.01) | |
| *E04H 17/18* | (2006.01) | |
| *E04H 17/16* | (2006.01) | |

(52) U.S. Cl.
CPC ............ *F16B 5/0692* (2013.01); *A01K 1/034* (2013.01); *E04H 17/163* (2013.01); *E04H 17/18* (2013.01); *Y10T 403/348* (2015.01)

(58) Field of Classification Search
CPC ....... E04H 17/16; E04H 17/163; E04H 17/18; F16B 7/0433; Y10T 403/342; Y10T 403/347; Y10T 403/348; A01K 1/02; A01K 1/03; A01K 1/0035; A01K 1/034; A47D 13/06; A47D 13/066
See application file for complete search history.

(56) References Cited

U.S. PATENT DOCUMENTS

| | | | | |
|---|---|---|---|---|
| 2,652,025 A | * | 9/1953 | Beatty | A01K 1/0005 119/519 |
| 3,020,023 A | * | 2/1962 | MacIntyre | E01F 9/692 256/24 |
| 3,776,521 A | * | 12/1973 | Weinert | E04G 21/3233 256/24 |
| 4,865,213 A | * | 9/1989 | Kruger | B65D 90/24 52/280 |
| 6,902,153 B1 | * | 6/2005 | Kenton | E04G 21/3233 256/65.1 |
| 9,089,212 B2 | * | 7/2015 | Chang | A47B 47/0016 |
| 9,903,401 B2 | * | 2/2018 | Pomerantz | E04H 1/1205 |

FOREIGN PATENT DOCUMENTS

| | | | | |
|---|---|---|---|---|
| DE | 42 07 104 | * | 11/1992 | E04H 17/16 |
| GB | 2 067 705 | * | 7/1981 | F16B 7/00 |

* cited by examiner

*Primary Examiner* — Michael P Ferguson
(74) *Attorney, Agent, or Firm* — CBM Patent Consulting, LLC (57) ABSTRACT

A connector is characterized by comprising a T-shaped main body, three connecting components and two connecting tubes, wherein the connecting components are arranged on one surface of the main body and located at three endpoints of the T-shaped main body. Each connecting component comprises a concave groove body and a connecting column which is arranged in a cavity of the concave groove body, wherein a gap exists between the connecting column and the inner wall of the concave groove body. The two connecting tubes are arranged between two connecting components at the bottom of the T-shaped main body side by side. Each connecting tube penetrates through the main body. Connecting holes are formed in the other surface of the main body.

5 Claims, 6 Drawing Sheets

CONNECTOR AND FENCE USING SAME

This application claims priority to Chinese Patent Application Ser. No. CN202020132187.1 filed on 21 Jan. 2020.

TECHNICAL FIELD

The present invention relates to the technical field of fence connection devices, in particular to a connector and a fence using the same.

BACKGROUND

At present, ordinary pet cages are often fixed by welding or riveting, and thus not easy to disassemble, move and carry.

In recent years, researches on assembled pet cages has begun, which have the advantages that a fence is modularized and can be spliced randomly.

For example, the Chinese patent (publication No. CN109717085A) discloses a dog cage. A plurality of suckers is respectively arranged at two ends of the upper short edge of a cage body. Two ends of the cage body can attract together to form a barrel shape, or can also be adsorbed to a wall to form a semi-circular shape, such that an activity space can be expanded. However, the suckers are easy to fall off because of insufficient connection strength. In addition, two identical cage body cannot implement 90° splicing.

The Chinese patent (publication No. CN204393955U) discloses a fence capable of being spliced randomly, which comprises a plurality of fence pieces, wherein every two adjacent fence pieces are connected through at least one connecting device capable of being fixed at a plurality of angles. After the adoption of the structure, the angle between the adjacent fence pieces can be adjusted randomly during assembling. Therefore, the fence can be constructed into various shapes. However, the fastness of the fence is not enough after the splicing. In particular, the same horizontal plane part formed by splicing a plurality of fence pieces lacks rigid support.

Another example is the Chinese patent (publication No. 202118046U) discloses a tubing connector and a pet cage composed of the connector. The tubing connector comprises a connector main body, wherein at least three connecting joints are disposed on the connector main body, and the central axes of every two adjacent connecting joints are vertical to each other. The outer side surface of the first vertical connecting joint is a square surface or an arc surface. Each connecting joint is integrally moulded with the connector main body, and cooperatively connected with a tubing frame. In this patent, the pet cage is assembled by the interference fit of tubing and the connector with 3-6 connecting joints. This patent has the following technical problems: 1. the connection strength is not enough: since a wall of the tubing for the pet cage is generally thin, the pet cage spliced by inserting the tubing into the connecting joints for interference fit connection shakes seriously. 2. Real modularization cannot be achieved, and all splicing problems cannot be solved by one connector.

Yet another example is the Chinese patent (publication No. CN207574251U) discloses an assembled pet cage. The assembled pet cage comprises a plurality of baffles, a first connector, a plurality of connecting rod and a plurality of second connectors. The plurality of baffles form side walls of the pet cage. Sockets are respectively arranged at four corners of each baffle. Each second connector correspondingly cooperates with two sockets of the two adjacent baffles, such that the respective baffles are connected to form the side walls of the pet cage. One end of each connecting rod is arranged on one second connector. The first connector is located above the side walls of the pet cage. The other end of each connecting rod is arranged on the first connector. The first connector is connected with the respective second connectors through the plurality of connecting rods. This patent solves the problem in terms of the connection strength. However, the side walls of the pet cage need to be spliced according to a preset angle of the first connector, and thus cannot be changed and expanded randomly.

SUMMARY

An object of the present invention is to overcome the defects of the prior art, and provide a connector which has a compact structure, firm connection strength, and complete modularity, i.e., 90° splicing, 180° splicing and ceiling splicing can be satisfied at the same time.

To fulfill said object, a connector is designed, which is characterized by comprising a T-shaped main body, three connecting components and two connecting tubes, wherein the connecting components are arranged on one surface of the main body and located at three endpoints of the T-shaped main body; each connecting component comprises a concave groove body and a connecting column which is arranged in a cavity of the concave groove body, wherein a gap exists between the connecting column and the inner wall of the concave groove body; the two connecting tubes are arranged between two connecting components at the bottom of the T-shaped main body side by side; each connecting tube penetrates through the main body; connecting holes are formed in the other surface of the main body.

Preferably, the concave groove body opens toward one end of the outside of the main body.

Preferably, the height of each connecting column is greater than the height of each concave groove body.

Preferably, the side wall of the inner cavity of each concave groove body is provided with symmetric notches.

Preferably, the two connecting tubes are arranged between two connecting components side by side, and the wall of each connecting tube is partially fused with the sidewall portion of the corresponding concave groove body.

Preferably, the cross section of each connecting column is polygonal.

Preferably, a limiting plate is arranged in an opening in the lower end of each connecting tube.

A fence using the above-described connector is designed, which is characterized by comprising a plurality of grill modules and a plurality of top frames, wherein each grill module comprises upright columns and crossbeams; the upper end and the lower end of each upright column of each grill module extends out of the corresponding crossbeams, and each upright column is a square hollow column; the upright columns of the grill modules can be cooperatively connected with the connecting components of the connector; the connecting columns of the connecting components are inserted into the hollow upright columns, and tube walls of the hollow upright columns are inserted between the concave grooves and the connecting columns; each top frame is spliced by a plurality of circular tubes, wherein each circular tube of the top frame cooperates with the corresponding connecting tube of the connector, and is inserted into the connecting tube through the connecting hole in the back surface of the main body.

Compared with the prior art, the present invention has the following advantages:

1. the connection strength is high, i.e., the connector is firmly connected with grill modules and ceiling frames, and thus unlikely to shake;

2. the structure is compact, and gaps between grill modules assembled by the connector of the present invention accords with international standards, and also satisfy 90° splicing, 180° splicing and ceiling splicing at the same time.

3. Complete modularization is achieved, i.e., modular connectors, modular grills, and modular ceiling frames can be spliced into a square pet cage of any size, and adjacent pet cages can share the same grill.

In drawings, reference symbols represent the following components: 1—connector; 2—connecting component; 3—concave groove body; 4—connecting column; 5—connecting tube; 6—grill module; 7—upright column; 8—crossbeam; 9—frame.

DETAILED DESCRIPTION

The present invention will be further described with reference to the accompanying drawings. The structure and principle of the present invention are very clear to those skilled in the art. It should be understood that the specific embodiments described herein are only used to explain the present invention and are not used to limit the present invention.

Figure 1:
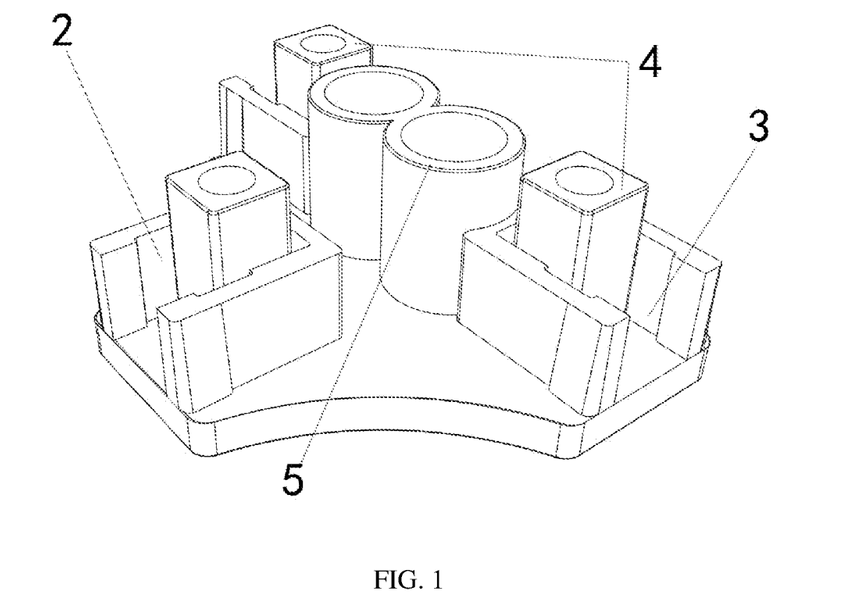
FIG. 1 is a perspective view of a connector of the present invention.
Figure 2:
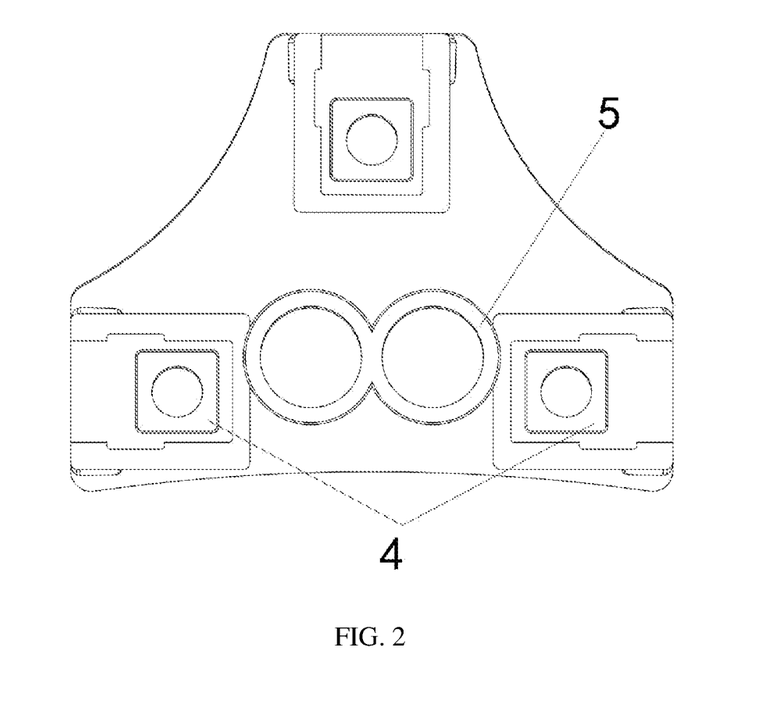
FIG. 2 is a top view of the connector of the present invention.
Figure 3:
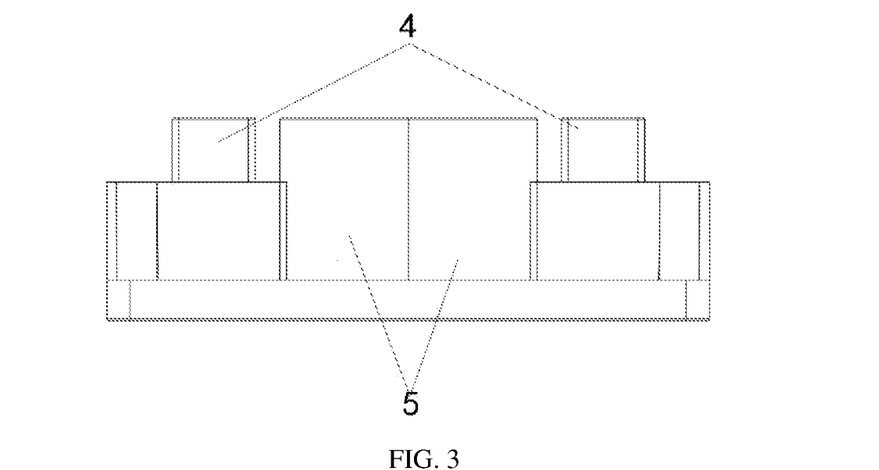
FIG. 3 is a main view of the connector of the present invention.

Embodiment 1: referring to FIGS. 1-3, the present invention designs a connector having a T-shaped main body. Three connecting components are arranged on one surface of the main body and located at three endpoints of the T-shaped main body. Each connecting component comprises a concave groove body and a connecting column which is arranged in a cavity of the concave groove body, wherein a gap exists between the connecting column and the inner wall of the concave groove body. Two connecting tubes are arranged at the bottom of the T-shaped main body side by side. Each connecting tube penetrates through the main body. Connecting holes are formed in the other surface of the main body. The concave groove body opens toward one end of the outside of the main body. The height of each connecting column is greater than the height of each concave groove body. The side wall of the inner cavity of each concave groove body is provided with symmetric notches. The two connecting tubes are arranged between two connecting components side by side, and the wall of each connecting tube is partially fused with the sidewall portion of the corresponding concave groove body. The cross section of each connecting column is polygonal. A limiting plate is arranged in an opening in the lower end of each connecting tube.

The connector of the present invention has three splicing methods.

Figure 4:
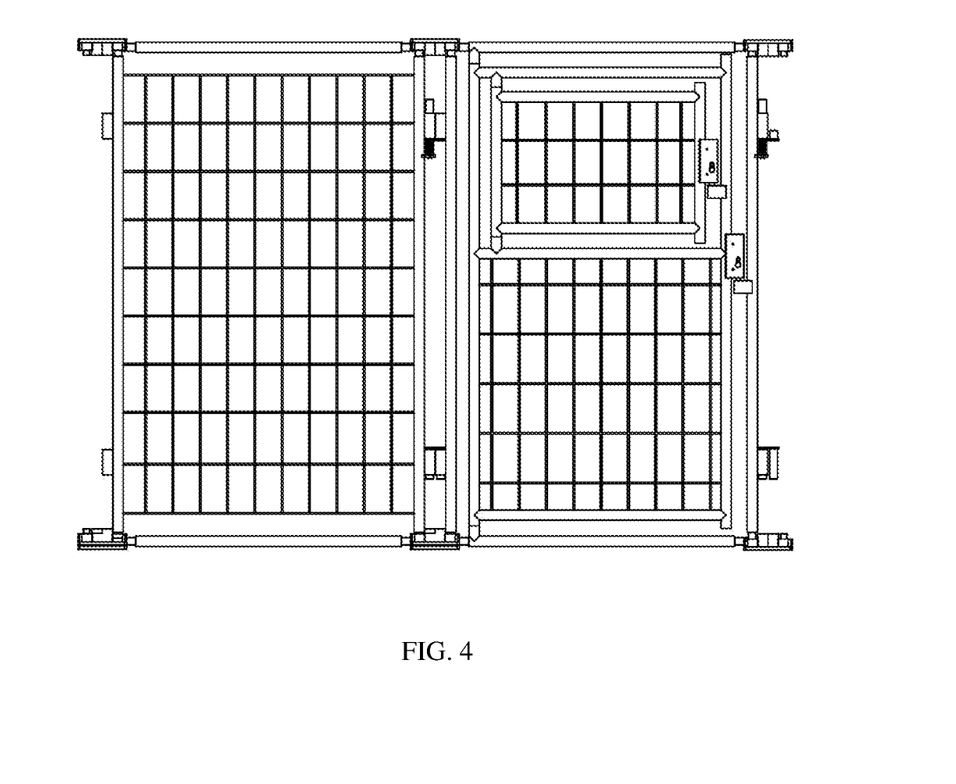
FIG. 4 is a schematic diagram of a first splicing method of the connector of the present invention.

As shown in FIG. 4, the crossbeams of the two grill modules are respectively inserted into the concave groove bodies of two connecting components at an angle of 180° among the three connecting components of the connector, so that the two grills form a plane.

Figure 5:
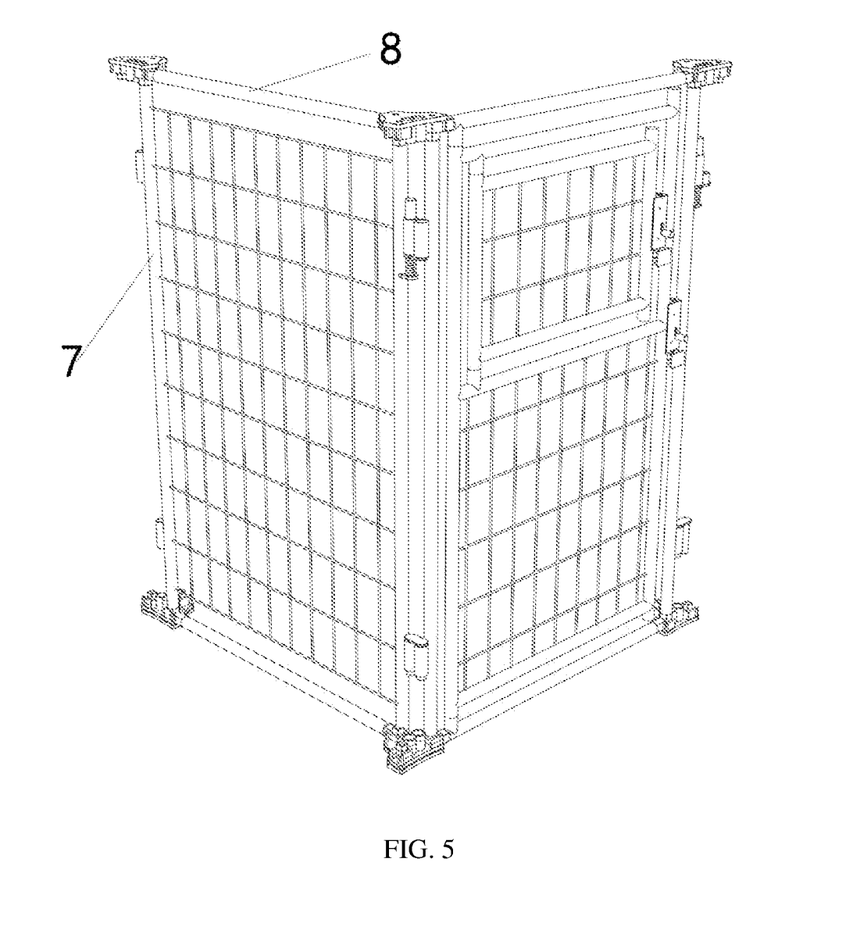
FIG. 5 is a schematic diagram of a second splicing method of the connector of the present invention.

As shown in FIG. 5, the crossbeams of the two grills are respectively inserted into the concave groove bodies of two connecting components at an angle of 90° among the three connecting components of the connector, so that the two grills form an included angle of 90°.

Figure 6:
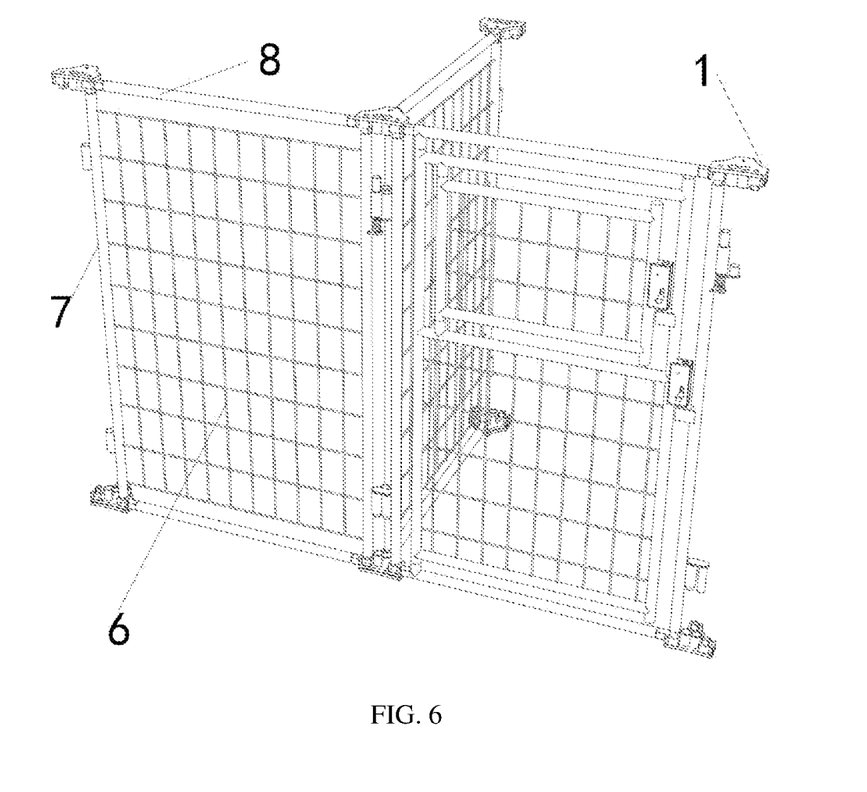
FIG. 6 is a schematic diagram of a third splicing method of the connector of the present invention.

As shown in FIG. 6, the crossbeams of three grills are respectively inserted into the concave groove bodies of the three connecting components of the connector, so that the three grills are in a T shape.

Figure 7:
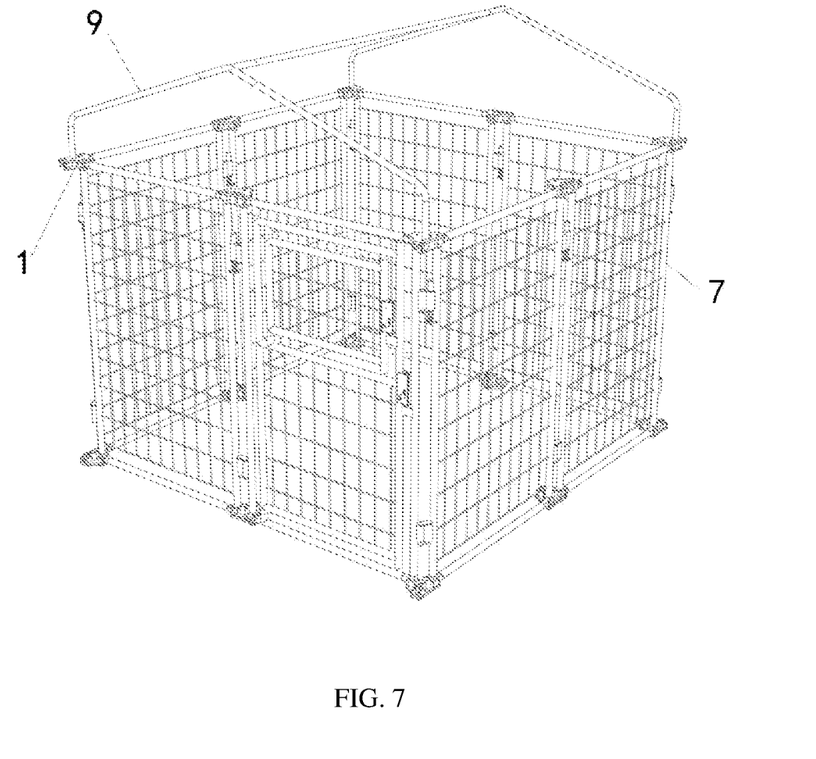
FIG. 7 is a schematic diagram of Embodiment 2 of the present disclosure.

Embodiment 2: referring to FIG. 7, a cage formed by the connector designed by the present invention comprises a plurality of grill modules. Each grill module comprises upright columns and crossbeams. The upper end and the lower end of each upright column of each grill module extend out of the corresponding crossbeams, and each upright column is a square hollow column. The upright columns of the grill modules can be cooperatively connected with the connecting components of the connector. The connecting columns of the connecting components are inserted into the hollow upright columns, and tube walls of the hollow upright columns are inserted between the concave groove bodies and the connecting columns. A plurality of top frames is arranged at the top of the cage. Each top frame is spliced by a plurality of circular tubes, wherein each circular tube of the top frame cooperates with the corresponding connecting tube of the connector, and is inserted into the connecting tube through the connecting hole in the back surface of the main body.

The cage in this embodiment is formed by a combination of the first and second splicing methods. Four groups of grills, each including two grills, form four planes by 180° splicing. The four planes form a closed quadrilateral cage by 90° splicing.

Figure 8:
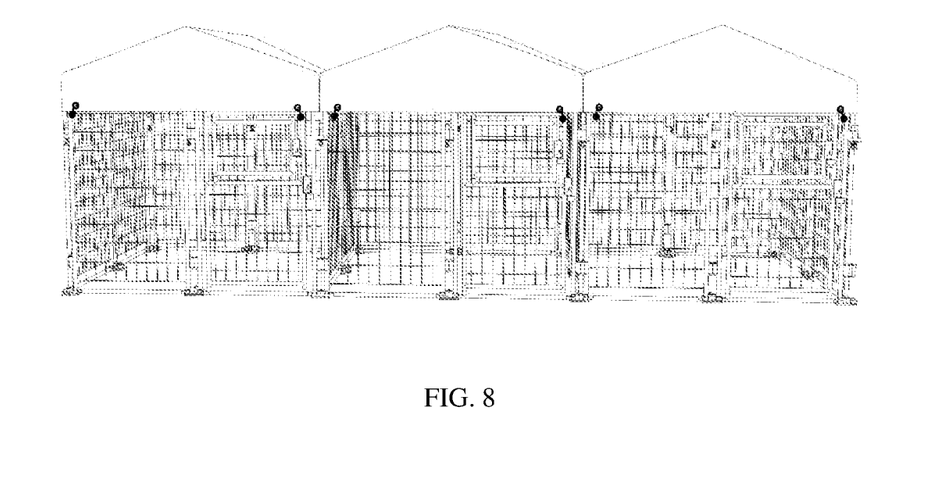
FIG. 8 is a schematic diagram of Embodiment 3 of the present disclosure.

Embodiment 3: referring to FIG. 8, the cage in this embodiment is composed of three cages in Embodiment 2. The three cages in Embodiment 2 are arranged in a row successively; two sides of the middle cage adjacent to the cages at two sides are removed; two sides of the cages on two sides are spliced with one side of the middle cage by using the third splicing method, that is, every two adjacent cages share one side, to finally form the cage shown in Embodiment 3.

Figure 9:
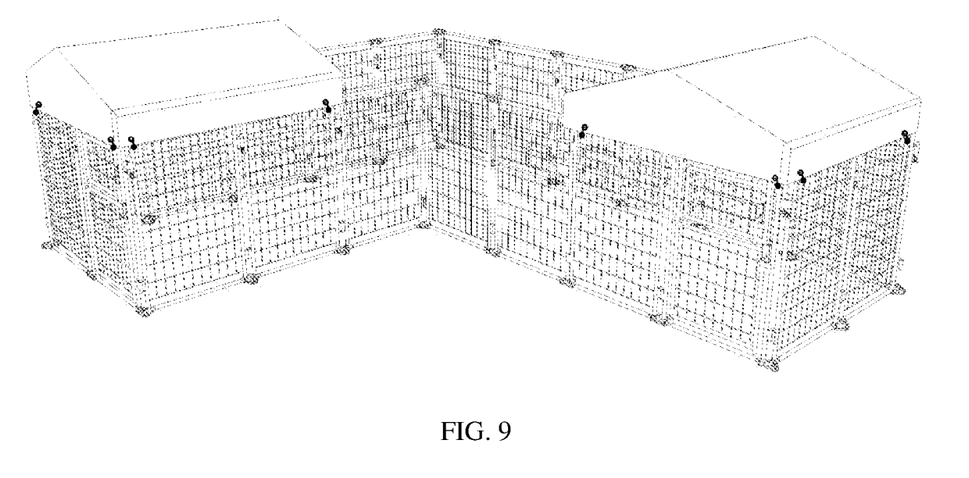
FIG. 9 is a schematic diagram of Embodiment 4 of the present disclosure.

Embodiment 4: referring to FIG. 9, the cage of this embodiment is an enlarged version of the cage shown in Embodiment 2. A quadrilateral cage can be formed by 180° splicing, and the direction of the sides of the cage can be changed by 90° splicing. In this embodiment, one side of the cage shown in Embodiment 2 is removed, and two sides adjacent to the removed side are then connected with one grill and two grills by 180° splicing. The grills rotate at an angle of 90° by 90° splicing, and a quadrilateral with varying angles is then formed by 180° splicing. In this way, a mansard cage can be spliced randomly.

What is claimed is:

1. A connector for a kennel, comprising:

a T-shaped planar main body defining three endpoints thereof, a pair of opposing endpoints disposed at opposing ends of a bottom edge of the main body and a third endpoint disposed between the pair of opposing endpoints and spaced from the bottom edge;

three identical connecting components (2) perpendicularly extending from a first planar surface of the main body and located at the three endpoints thereof, each connecting component comprising a concave groove body (3) comprising a U-shaped wall having an outwardly-facing opening, and a square connecting column (4) which is arranged in a cavity of the concave groove body, wherein the connecting column is surrounded by an inner surface of the U-shaped wall such to define a gap therebetween;

wherein the openings of the concave grooves disposed at the opposing endpoints along the bottom edge face outwardly 180° from one another and the opening of the concave groove disposed at the third endpoint faces outwardly 90° from the bottom edge, and wherein each concave groove is configured to receive a hollow upright column of a wire panel grill module of the kennel therein with a square tubular end of the hollow column matingly disposed between the inner surface of the U-shaped wall and the connecting column; and two identical connecting tubes (5) arranged side-by-side along the bottom edge of the main body and perpendicularly extending from the first planar surface between the concave grooves disposed at the opposing endpoints, each connecting tube comprising an inner cylindrical surface defining a hollow interior, and a connecting hole penetrating through the main body to a second planar surface thereof, wherein an outer wall surface of each connecting tube is fused with the U-shaped wall of the respective adjacent concave groove body; and wherein each connecting tube is configured to receive a tubular frame member of a roof of the kennel therein with a round tubular end of the frame member extending through the connecting hole from the second planar surface side of the main body and being matingly received by the inner cylindrical surface of the connecting tube.

2. The connector according to claim 1, wherein the height of each connecting column (4) is greater than the height of each concave groove body.

3. The connector according to claim 1, wherein the inner surface of the U-shaped wall of each concave groove cavity (3) is provided with symmetric notches.

4. The connector according to claim 1, wherein a limiting plate is arranged in an opening in a lower end of each connecting tube (5).

5. A kennel using the connector according to claim 1, comprising:

a plurality of wire panel grill modules (6), wherein each grill module (6) comprises upright columns (7) and crossbeams (8); an upper end and a lower end of each upright column (7) of each grill module extends out of the corresponding crossbeams; the upright columns of the grill modules can be cooperatively connected with the connecting components (2) of the connector; the connecting columns of the connecting components are inserted into the hollow upright columns, and tube walls of the hollow upright columns are inserted between the concave groove bodies and the connecting columns; and a plurality of tubular frame members (9) of a roof, wherein each frame member is spliced from a plurality of circular tubes, each circular tube of each of the frame members cooperates with a corresponding connecting tube of the connector, and is inserted into the connecting tube through the connecting hole from the second planar surface side of the main body.

* * * * *

UNITED STATES PATENT AND TRADEMARK OFFICE
CERTIFICATE OF CORRECTION

PATENT NO. : 11,585,360 B2
APPLICATION NO. : 17/019291
DATED : February 21, 2023
INVENTOR(S) : Hongwen Zhu It is certified that error appears in the above-identified patent and that said Letters Patent is hereby corrected as shown below:

On the Title Page

Add Item (30) Foreign Application Priority Data:
"(30) Foreign Application Priority Data
January 21, 2020 (CN) .................. 202020132187.1"

Signed and Sealed this
Twenty-eighth Day of March, 2023

Katherine Kelly Vidal
*Director of the United States Patent and Trademark Office*